(12) United States Patent  
Dheap et al.

(10) Patent No.: US 8,917,853 B2  
(45) Date of Patent: Dec. 23, 2014

(54) ENHANCED CUSTOMER EXPERIENCE THROUGH SPEECH DETECTION AND ANALYSIS

(75) Inventors: Vijay Dheap, Durham, NC (US); Nicholas E. Poore, Durham, NC (US); Lee M. Surprenant, Cary, NC (US); Michael D. Whitley, Weddington, NC (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 13/526,966

(22) Filed: Jun. 19, 2012

(65) Prior Publication Data

US 2013/0336465 A1  Dec. 19, 2013

(51) Int. Cl.
*H04M 3/00* (2006.01)
*H04M 5/00* (2006.01)

(52) U.S. Cl.
USPC ............ 379/265.02; 379/265.07; 379/265.13; 704/246

(58) Field of Classification Search
CPC ..... H04M 3/51; H04M 3/523; H04M 3/5183; H04M 3/5173; H04M 3/5232
USPC ............ 379/265.02, 265.07, 265.13; 704/246
See application file for complete search history.

(56) References Cited

U.S. PATENT DOCUMENTS

| 6,134,315 | A | 10/2000 | Galvin |
| 7,788,095 | B2 | 8/2010 | Wasserblant et al. |
| 7,953,219 | B2 * | 5/2011 | Freedman et al. ....... 379/265.06 |
| 8,051,086 | B2 | 11/2011 | Jeffs et al. |
| 2006/0053009 | A1 | 3/2006 | Jeong et al. |
| 2008/0152122 | A1 | 6/2008 | Idan et al. |
| 2008/0189171 | A1 * | 8/2008 | Wasserblat et al. ............. 705/11 |
| 2010/0332477 | A1 | 12/2010 | Jeffs et al. |
| 2011/0055699 | A1 * | 3/2011 | Li et al. ......................... 715/709 |

OTHER PUBLICATIONS

Kim et al., "Angry Emotion Detection from Real-Life Conversational Speech by Leveraging Content Structure", Proceedings of 2010 IEEE Int'l Conference on Acoustics, 978-1-4244-4296-6/10, pp. 5166-5169, 2010.
IBM, "Using Speech Recognition Voice Signature Input to Take Specific Actions Based on Specific Inbound Callers on Voice Channel"; http://www.ip.com/pubview/IPCOM000030342D; Aug. 6, 2004.
IBM, "Drive Intelligent Interface to Call Center Agent and Customer Based on Speech Recognition Data"; http://www.ip.com/pubview/IPCOM000030339D, Aug. 6, 2004.
Anonymous, "Speech Recognition Assisted Call Center and Self-Service Interface"; http://www.ip.com/pubview/IPCOM000182420D, Apr. 30, 2009.

* cited by examiner

*Primary Examiner* — Simon King
(74) *Attorney, Agent, or Firm* — Scully, Scott, Murphy & Presser, P.C.; Dermott Cooke, Esq.

(57) ABSTRACT

A method and system for enhancing problem resolution at a call center based on speech recognition of a caller includes, receiving an incoming call and generating call data based on speech recognition of the incoming call using a computer. The method generates and associates annotated metadata about the call data. A historical record is created which includes the call data and the annotated metadata. The historical record may be stored in a storage medium communicating with the computer. Context data is generated for the incoming call by analyzing the historical record to identify: a caller, a topic, a date and a stress level of the caller. The method compares the context data to historical records of previous calls. A topic probabilities analysis is conducted by comparing the context data to the historical records of previous calls, and a solution is determined for the topic based on the probabilities analysis.

18 Claims, 2 Drawing Sheets

ENHANCED CUSTOMER EXPERIENCE THROUGH SPEECH DETECTION AND ANALYSIS

FIELD

The present disclosure relates to a method and system for call center problem resolution, and more particularly, relates to a method and system for resolving call center topics/problems using speech recognition and probability analysis.

BACKGROUND

Techniques for enhancing call center performance may include improving customer interactions with the call center and the call center's agents. For example, attempt to increase call center performance may include implementing a computer related method that includes accepting user input for analysis of a database having media data and metadata for more rapidly solving the user's problem. Other call center call topic resolution enhancements may include input from a supervisor using a grading system to indicate preferred solutions to problems, or presenting analyses to a call center agent for helping in a decision making process. Other techniques may include searching for words in one or more files to build a knowledge base from previous call topics and solution. In call centers, first call resolution is an important metric to gauge customer satisfaction. Another important metric used by call centers is the length of call time, or the amount of time a customer spends getting service including talking to an agent. Most call routing in typical call centers is based on services offered, for example, using the key pad of a telephone to select areas of interest, rather than the needs of the customer, for example, repeated calls from the customer, or urgency to the customer.

It would therefore be desirable to improve call center response metrics. It would further be advantageous to improve the customer's experience with the call center while improving call center response metrics.

BRIEF SUMMARY

According to an aspect of the disclosure, a method for enhancing problem resolution at a call center based on speech recognition of a caller includes: receiving an incoming call and generating call data based on speech recognition of the incoming call using a computer having a processor; generating and associating annotated metadata about the call data; creating a historical record including the call data and the annotated metadata, the historical record being stored in a storage medium communicating with the computer; generating context data for the incoming call by analyzing the historical record to identify: a caller, a topic, a date and a stress level of the caller; comparing the context data to historical records of previous calls; conducting a topic probabilities analysis by comparing the context data to the historical records of previous calls; and determining a solution for the topic based on the probabilities analysis.

In another aspect according to the disclosure, a system for enhancing problem resolution at a call center based on speech recognition of a caller includes, a processor for executing a speech recognition module configured to receive an incoming call and generate call data of the incoming call. The processor further executes a module for associating annotated metadata about the call data with the call data. A storage module communicates with the processor for storing a historical record which includes the call data and the annotated metadata. The module is configured to generate context data for the incoming call by analyzing the historical record to identify: a caller, a topic, a date and a stress level of the caller. The module is further configured to compare the context data to historical records of previous calls, conduct a topic probabilities analysis by comparing the context data to the historical records of previous calls, and determine a solution for the topic based on the probabilities analysis.

In another aspect according to the disclosure, a computer readable storage medium storing a program of instructions executable by a machine to perform a method for enhancing problem resolution at a call center based on speech recognition of a caller, includes: receiving an incoming call and generating call data based on speech recognition of the incoming call; generating and associating annotated metadata about the call data; creating a historical record including the call data and the annotated metadata, the historical record being stored in a storage medium communicating with the computer; generating context data for the incoming call by analyzing the historical record to identify: a caller, a topic, a date and a stress level of the caller; comparing the context data to historical records of previous calls; conducting a topic probabilities analysis by comparing the context data to the historical records of previous calls; and determining a solution for the topic based on the probabilities analysis.

Further features as well as the structure and operation of various embodiments are described in detail below with reference to the accompanying drawings. In the drawings, like reference numbers indicate identical or functionally similar elements.

DETAILED DESCRIPTION

Figure 1:
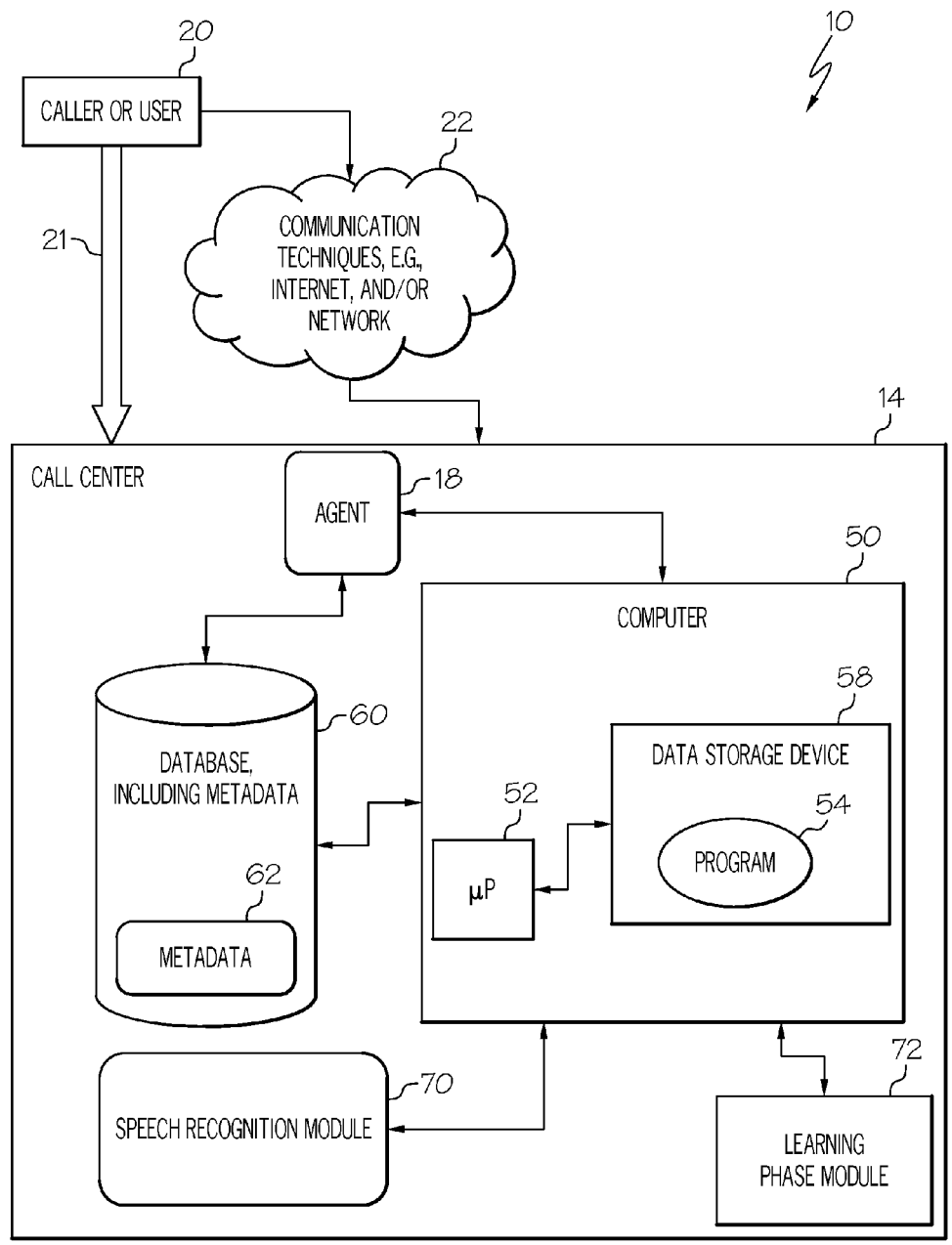
FIG. 1 is a schematic diagram illustrating an overview of the methodology of the present disclosure in one embodiment.
Figure 2:
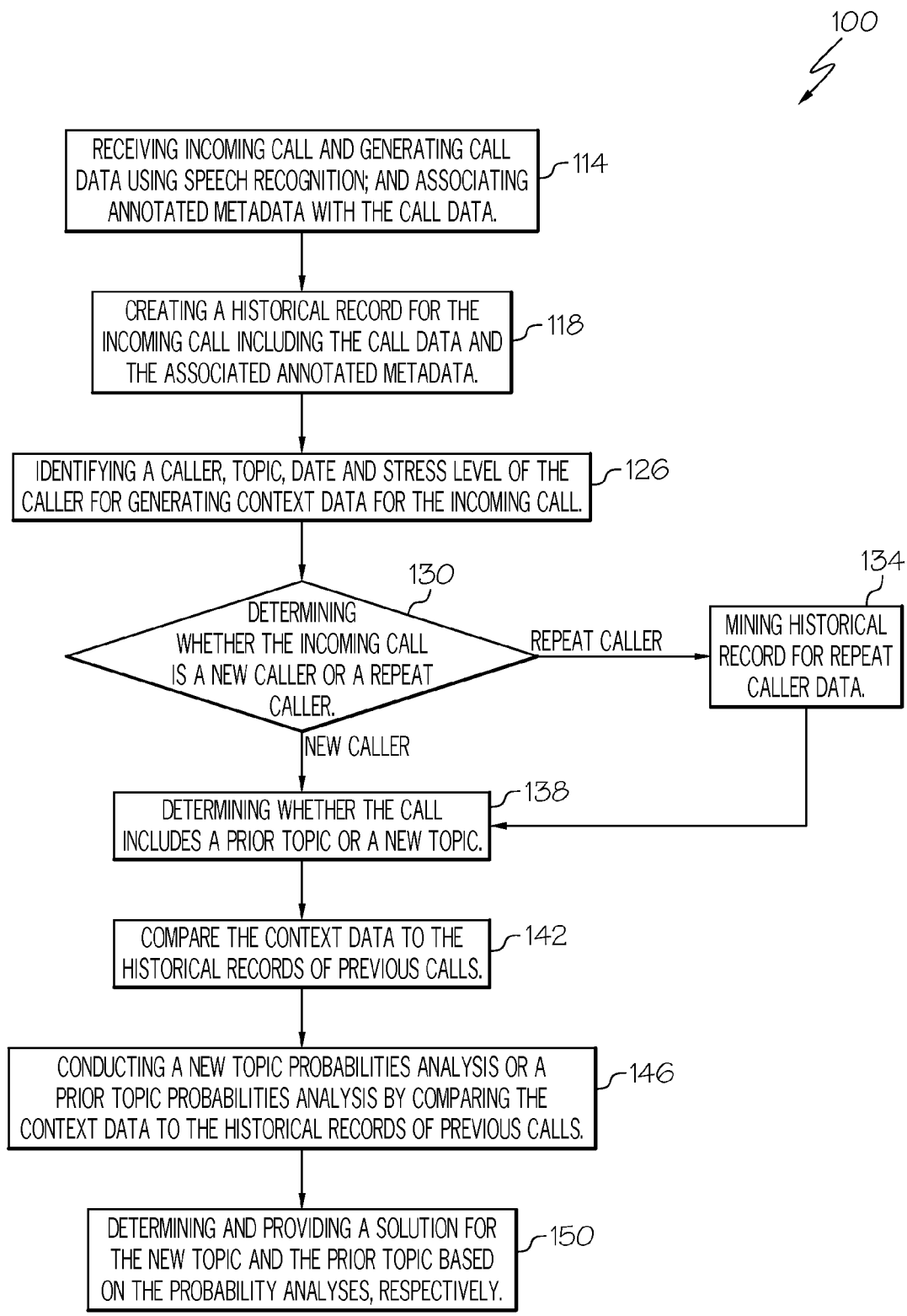
FIG. 2 is a flow diagram illustrating a method for enhancing the customer experience through a call center in one embodiment of the present disclosure.

Referring to FIGS. 1 and 2, a system 10 and method 100 according to an embodiment of the disclosure, enhances problem resolution and routing of calls at a call center 14 using speech recognition. Step 114 of the method 100 of FIG. 2 includes, receiving an incoming call and generating call data from a user or caller 20 using a speech recognition module 70. The call data is associated with annotated metadata 62 related to the incoming call. The annotated metadata 62 may be contemporaneously generated, and stored in a database 60 with annotated metadata associated with previous calls or related calls. The annotated metadata may include data about the incoming call data, such as, call center agent comments, or computer generated notes regarding the incoming call. The annotations may include the agent's observations regarding the caller or the topic, and possible solutions to a problem.

The annotated metadata 62 may also be searched for and retrieved from the database 60 which includes call data from previous incoming calls. The caller may be a person using one of many modes of communication including, for example, a land line 21 serviced by a telephone company. Other forms of communication include the Internet, or a network, alone or in combination, with the Internet, are collectively illustrated by communication techniques 22 in FIG. 1. Step 114, at least in part, may be implemented using a computer 50 having a processor 52 for executing a program 54 embodied on a computer readable medium or storage device 58. The computer readable medium 58 may include a hard drive, read only memory, or flash memory. The annotated metadata and call data provide context to the incoming calls.

Step 118 includes creating a historical record for the incoming call including, the call data and the associated annotated metadata. The call data for the caller may be analyzed to find previous calls by the same user, as well as other callers who have had the same or similar topics stored as historical records.

Step 126 includes identifying a caller, topic, date, and stress level for the incoming call. Step 126 further includes generating context data for the incoming call and the topic of the incoming call by analyzing the historical record, including the annotated metadata, and including related call data and metadata. The historical record may be stored in the database 60 for access by the computer 50. The context data may further include previous solutions to the topic, or related topics, and a stress level of the caller.

The steps 114-126 may be conducted contemporaneously and include the speech recognition module 70 analyzing the speech of the caller and identifying the caller based on the speech analysis, before a call center agent talks to the caller. For example, the caller may be prompted to answer one or more questions. Further, the caller can be identified as a previous caller or a new caller. For previous callers, prior issues or topics can be found and noted for the call center agent. Further, an assessment can be made as to whether a prior topic or new topic is being presented, as will be discussed in greater detail below.

The method 100 continues to step 130 to determine whether the incoming call is a new caller or a repeat caller. If the caller is a repeat caller, the method 100 continues to step 134 to mine the historical record for the call data of the previous call or calls, and then continues to step 138 to determine if the call includes a prior topic or a new topic. If the caller is a new caller at step 130, the method 100 continues directly to step 138 to determine if the call includes a prior topic or a new topic. Step 142 includes comparing the context data to the historical records of previous calls. For example, mining the historical record for related topics to a new topic, or mining the historical record for a prior topic and related topics to a prior topic, and comparing the context data from the incoming call. Further, if the caller is a repeat caller, the historical records are mined for data records pertaining to the prior call, and for relevant data pertaining to the topic whether the topic is a new topic or a prior topic.

Step 146 includes conducting a new topic probabilities analysis or a prior topic probabilities analysis using the historical record related to the new topic or the prior topic. For example, previous call data can be analyzed for data related to the new topic or a prior topic to provide a probability analysis for determining a solution with the highest probability of solving the problem of the topic. The analysis may include all context data from the speech recognition, wherein the speech recognition indicates voice stress of the caller.

One example of evaluating voice stress includes using a key word indicator method, wherein the key work is typically used in a stressful vocabulary, thus triggering recognition of voice stress. Examples of terms which could indicate an elevated stress level are: frustrate, running out of patience. Another example of evaluating voice stress includes ascertaining the level of volume of the caller's voice to indicate stress level.

One example of a probabilities analysis includes the method of the present disclosure evaluating whether a current problem indicated by a caller is related to a previous problem in the database. For example, if the caller states that their internet is not working on their computer, this problem may correlate with a previous problem related to an internet router being offline and needing to be reset.

The method 100 includes determining a solution for the new topic or the prior topic for a new or repeat caller based on respective probability analyses, as in step 150. For example, a solution for a new topic may be determined by mining the historical records of metadata corresponding to the new topic, and determining a solution by comparing the context data including the new topic to the historical records of previous call data. In another example, a solution for a prior topic may be determined by mining the historical record of metadata corresponding to a prior topic, and determining and providing a solution by comparing the context data to the historical records of previous call data relevant to the topic. The relevant call data may include previous call data analyzed for data related to the prior topic or a new topic to provide a solution with the highest probability of solving the problem of the topic based on the historical records of previous call data. In one example, a solution may include highlighting other agents' responses related to a prior topic or a new topic.

The method 100 may include assigning a weight to the historical record data (i.e., call data and annotated metadata). The data with an assigned weight may also be referred to as attributes of the incoming call. Assigning a weight may be organically developed during a learning phase by learning phase module 72 of the computer 50. In one example, the program 54 may define attributes and assign a weight to each of the attributes in the call data derived from speech analysis of the caller. Alternatively, the call center agent may assign a weight to call data or annotated metadata based on the caller and topic context. The assigned weight may be stored in the database 60 for use in deriving a solution by one or more probability analyzes as in step 146 of the method 100. The method, in the learning phase, may also include saving one or more solutions associated with the topic in the historical record, and assigning a weight to the solutions based on their likelihood of success derived from the metadata in the historical record.

The learning phase may include iteratively conducting the topic probabilities analysis to provide a plurality of solutions associated with the topic, and saving the plurality of solutions associated with the topic in the historical record. A weight to the solutions based on their likelihood of success may be added in the learning phase. For example, the learning phase can be embodied as a generic algorithm in which attributes of a call are evaluated by the algorithm, and the algorithm provides possible solutions. The possible solutions are used to optimize solutions for the problem, for instance, given a set of XYZ attributes, the call can be routed to low level agents or higher level agents. Using multiple problems and solutions, it may be found that for XYZ attributes, a low level agent works best in resolving the problem, thus providing the best solution in future cases. The call center agent may also insert manual weighting or scores, and annotations to override or supplement the learning phase solution(s) based on their own evaluations.

The learning phase of the method 100 may include adding to the historical record by adding annotated metadata and weight associated with an incoming call, including the caller stress and mood. Thereby, the learning phase adds to and maximizes the context of the call to facilitate the best possible solution to a topic, and resolve the caller's issues most efficiently.

Additionally, assisting an agent is resolving an incoming call may include, for example, using previous context data of a call center's speech analyzed calls to index a set of common issues. The index can serve as both training and for practical access to provide possible solutions to agents while resolving incoming calls. For example, an index may be used by the method in finding a solution to a problem by providing an index of one or more solutions to a first problem. When the method determines that a second problem is similar to the first problem, the method can provide one or more of the solutions for the first problem to solve the second problem.

In one example, the system 10 and method 100 may index known callers at the call center by issues, and the call center agent can annotate calls with annotated metadata. Models or algorithms can be used to provide agents with accurate context to an incoming call. The method 100 can mine a subset of historical calls (i.e., previous call data) and use the models and algorithms to learn how to detect relevance in a learning phase. The learning phase may be implemented by the models and algorithms accessing the subset of the historical calls to analyze known solutions and context data to learn how to detect the most relevant data. Therefore, when the solution to a problem or topic is not known, the method can use the learned algorithms to provide the best solution to the topic.

Thereby, the speech analysis of the method of the present disclosure can provide information on whether it is a first time caller or a secondary caller. Typically, customers generally navigate automated voice response units and may be prompted multiple times before they are even identified, thus, their speech can be used to identify them (i.e., with voice/speech recognition software). This allows for personalization of service more than using an identifier for a product or household, because more than one customer may share the same identifier (i.e., family members inquiring about different matters). Further, speech analysis of past calls can provide valuable insights on the nature of the current call. For example, understanding the customer's problem helps an agent deliver higher quality service. The method 100 not only analyzes customer's current speech with prior calls they made, but other callers as well. This provides an agent with better understanding of how issues may have been resolved in the past, for example, if a technique was considered to address an issue in the past by other agents. Thus, the present disclosure employs speech analysis to improve call center metrics used to measure customer service by providing additional and improved context, e.g., context data) to aid in providing solutions to problems/topics, resulting in improving overall customer experience.

FIG. 1 illustrates a schematic of an example call center and a representative computer system or processing system that may implement the method and program 54 in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with one or more processing systems in the present disclosure may include, but are not limited to, personal computer systems, server computer systems, handheld or laptop devices, multiprocessor systems, microprocessor-based systems, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. Computer system may include a variety of computer system readable media. Such media may be any available media that is accessible by computer system, and it may include both volatile and non-volatile media, removable and non-removable media. System memory 58, shown in FIG. 1, can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces. Additionally, computer systems can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present disclosure is limited to these particular embodiments. Thus, various changes and modifications may be effected by one skilled in the art without departing from the spirit or scope of the disclosure as defined in the appended claims.

We claim:

1. A method for enhancing problem resolution at a call center based on speech recognition of a caller, comprising:
    receiving an incoming call and generating call data based on speech recognition of the incoming call using a computer having a processor;
    generating and associating annotated metadata about the call data;
    creating a historical record including the call data and the annotated metadata, the historical record being stored in a storage medium communicating with the computer, the historical record storing solutions associated with the call data and the annotated metadata and indexing callers by issues identified by the call data and the annotated metadata;
    generating context data for the incoming call by analyzing the historical record to identify: a caller, a topic, a date and a stress level of the caller;
    comparing the context data to historical records of previous calls;
    conducting a topic probabilities analysis by comparing the context data to the historical records of previous calls;
    assigning a weight to each solution in the historical record based on likelihood of success derived from the annotated metadata; and
    determining a solution for the topic based on the probabilities analysis and further based on the assigned weight of each solution.

2. The method of claim 1, further comprising:
    determining whether the incoming call is a new caller or a repeat caller.

3. The method of claim 1, further comprising:
    determining whether the incoming call includes a prior topic or a new topic.

4. The method of claim 1, further comprising:
    defining an attribute from the call data or the annotated metadata; and
    assigning a weight to the attribute.

5. The method of claim 4, wherein the computer completes the steps of defining the attribute and assigning the weight to the attribute.

6. The method of claim 4, wherein a call center agent completes the steps of defining the attribute and assigning the weight to the attribute.

7. The method of claim 4, wherein the solution for the topic is also based on the weight assigned to the attribute.

8. The method of claim 1, wherein a learning phase includes reiteratively conducting the topic probabilities analysis to provide a plurality of solutions associated with the topic.

9. The method of claim 8, wherein the learning phase includes saving the plurality of solutions associated with the topic in the historical record.

10. The method of claim 1, further comprising:
    conducting a new topic probabilities analysis and a prior topic probabilities analysis using the historical record for a new topic and a prior topic; and
    determining a new topic solution for the new topic and a prior topic solution for the prior topic based on the new and prior topic probabilities analyses, respectively.

11. The method of claim 1, wherein the context data further includes:
    data for a previous corresponding incoming call, a solution to a previous topic of the previous corresponding incoming call; and a mood level of the caller.

12. A system for enhancing problem resolution at a call center based on speech recognition of a caller, comprising:
    a processor for executing a speech recognition module configured to receive an incoming call and generate call data of the incoming call, and the processor for executing a first module for associating annotated metadata about the call data with the call data;
    a storage module communicating with the processor for storing a historical record which includes the call data and the annotated metadata, the historical record storing solutions associated with the call data and the annotated metadata and indexing callers by issues identified by the call data and the annotated metadata; and
    the first module configured to generate context data for the incoming call by analyzing the historical record to identify: a caller, a topic, a date and a stress level of the caller, the first module further configured to compare the context data to historical records of previous calls, conduct a topic probabilities analysis by comparing the context data to the historical records of previous calls, assign a weight to each solution in the historical record based on likelihood of success derived from the annotated metadata, and determine a solution for the topic based on the probabilities analysis and further based on the assigned weight of each solution.

13. The system of claim 12, wherein the first module further defines an attribute from the call data or the annotated metadata and assigns a weight to the attribute.

14. The system of claim 12, wherein the processor includes a learning phase module which iteratively conducting the topic probabilities analysis to provide a plurality of solutions associated with the topic, saves the plurality of solutions associated with the topic in the historical record.

15. A non-transitory computer readable storage medium storing a program of instructions executable by a machine to perform a method for enhancing problem resolution at a call center based on speech recognition of a caller, comprising:
    receiving an incoming call and generating call data based on speech recognition of the incoming call using a computer having a processor;
    generating and associating annotated metadata about the call data;

creating a historical record including the call data and the annotated metadata, the historical record being stored in a storage medium communicating with the computer, the historical record storing solutions associated with the call data and the annotated metadata and indexing callers by issues identified by the call data and the annotated metadata;

generating context data for the incoming call by analyzing the historical record to identify: a caller, a topic, a date and a stress level of the caller;

comparing the context data to historical records of previous calls;

conducting a topic probabilities analysis by comparing the context data to the historical records of previous calls;

assigning a weight to each solution in the historical record based on likelihood of success derived from the annotated metadata; and determining a solution for the topic based on the probabilities analysis and further based on the assigned weight of each solution.

16. The non-transitory computer readable storage medium of claim 15, further comprising:

defining an attribute from the call data or the annotated metadata; and assigning a weight to the attribute.

17. The non-transitory computer readable storage medium of claim 15, wherein a learning phase includes iteratively conducting the topic probabilities analysis to provide a plurality of solutions associated with the topic, saving the plurality of solutions associated with the topic in the historical record.

18. The non-transitory computer readable storage medium of claim 15, wherein the context data further includes:

data for a previous corresponding incoming call, a solution to a previous topic of the previous corresponding incoming call; and a mood level of the caller.

* * * * *